(12) United States Patent
Kachita et al.

(10) Patent No.: US 8,068,730 B2
(45) Date of Patent: Nov. 29, 2011

(54) WAVELENGTH DIVISION MULTIPLEX SIGNAL MONITORING SYSTEM AND WAVELENGTH DIVISION MULTIPLEX TRANSMISSION DEVICE EQUIPPED WITH THE SAME

(75) Inventors: Yoshito Kachita, Kawasaki (JP); Ichiro Nakajima, Kawasaki (JP); Yasushi Sugaya, Kawasaki (JP); Ryosuke Goto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 671 days.

(21) Appl. No.: 12/219,862

(22) Filed: Jul. 29, 2008

(65) Prior Publication Data

US 2009/0041456 A1  Feb. 12, 2009

(30) Foreign Application Priority Data

Aug. 7, 2007  (JP) .................. 2007-205607

(51) Int. Cl.
 *H04B 10/08* (2006.01)
(52) U.S. Cl. .................. 398/34; 398/38; 398/33; 398/94
(58) Field of Classification Search .................... 398/34, 398/27, 33, 38, 79, 94
See application file for complete search history.

(56) References Cited

U.S. PATENT DOCUMENTS

2007/0201878 A1 * 8/2007 Nakashima et al. .......... 398/177

FOREIGN PATENT DOCUMENTS

| JP | 2003-332983 | 11/2003 |
|---|---|---|
| JP | 2006-352364 | 12/2006 |

* cited by examiner

*Primary Examiner* — M. R. Sedighian
(74) *Attorney, Agent, or Firm* — Staas & Halsey LLP

(57) ABSTRACT

A WDM signal monitoring system includes a measuring unit that measures power levels in a plurality of predetermined wavelength bands about a wavelength division multiplex signal, a waveform determination unit that determines an approximate waveform of each channel from each bit rate and modulation system of a plurality of channels which forms a wavelength division multiplex signal, and an approximation unit that determines a power level and a wavelength of each channel by approximating the power level in a plurality of wavelength bands which the measuring unit measured with the approximate waveform of each channel which the waveform determination unit determined.

11 Claims, 27 Drawing Sheets

FIG. 20

| CHANNEL CH | BIT RATE [Gbit/s] | MODULATION SYSTEM |
|---|---|---|
| 1 | 10 | DPSK |
| 2 | 40 | NRZ |
| 3 | 40 | QPSK |
| ... | ... | ... |
| 7 | 40 | NRZ |
| ... | ... | ... |
| 40 | 10 | NRZ |

FIG. 21

| BIT RATE [Gbit/s] | MODULATION SYSTEM | APPROXIMATION PROCEDURE |
|---|---|---|
| 10 | NRZ | APPROXIMATE WAVEFORM 1 |
| 40 | NRZ | APPROXIMATE WAVEFORM 2 |
| ... | ... | ... |
| 40 | DPSK | APPROXIMATE WAVEFORM 6 |
| ... | ... | ... |
| 40 | QPSK | APPROXIMATE WAVEFORM 8 |
| ... | ... | ... |

FIG. 22

| CHANNEL CH | BIT RATE [Gbit/s] | ROUTE INFORMATION | MODULATION SYSTEM |
|---|---|---|---|
| 1 | 10 | 2, 3, 4 | DPSK |
| 2 | 40 | | NRZ |
| 3 | 40 | 4 | QPSK |
| ... | ... | ... | ... |
| 7 | 40 | 1, 2, 3, 4 | NRZ |
| ... | ... | ... | ... |
| 40 | 10 | | NRZ |

FIG. 23

| BIT RATE [Gbit/s] | MODULATION SYSTEM | ROUTE INFORMATION | APPROXIMATION PROCEDURE |
|---|---|---|---|
| 10 | NRZ | | APPROXIMATE WAVEFORM 1 |
| 40 | NRZ | | APPROXIMATE WAVEFORM 2 |
| ... | ... | ... | ... |
| 40 | NRZ | 1, 2, 3, 4 | APPROXIMATE WAVEFORM 3 |
| ... | ... | ... | ... |
| 40 | DPSK | 1, 2 | APPROXIMATE WAVEFORM 6 |
| ... | ... | ... | ... |
| 40 | QPSK | 3, 4 | APPROXIMATE WAVEFORM 7 |
| ... | ... | ... | ... |

FIG. 24

| DEVICE NUMBER | CHANNEL CH | BIT RATE [Gbit/s] | ROUTE INFORMATION | MODULATION SYSTEM |
|---|---|---|---|---|
| 1 | 7 | 40 | | NRZ |
| | 8 | 10 | | NRZ |
| 2 | 1 | 10 | 1 | NRZ |
| | 7 | 40 | 1 | NRZ |
| | 8 | 10 | ... | NRZ |
| ... | 1 | 10 | 2, 3, 4 | DPSK |
| | 2 | 40 | | NRZ |
| | 3 | 40 | 4 | QPSK |
| 5 | ... | ... | ... | ... |
| | 7 | 40 | 1, 2, 3, 4 | NRZ |
| | ... | ... | ... | ... |
| | 40 | 10 | | NRZ |

WAVELENGTH DIVISION MULTIPLEX SIGNAL MONITORING SYSTEM AND WAVELENGTH DIVISION MULTIPLEX TRANSMISSION DEVICE EQUIPPED WITH THE SAME

CROSS-REFERENCE TO RELATED APPLICATIONS

This application is based upon and claims the benefit of priority from the prior Japanese Patent Application No. 2007-205607 filed on Aug. 7, 2007, the entire contents of which are incorporated herein by reference.

BACKGROUND

1. Field

The present invention relates to a WDM signal monitoring system that monitors a power level and a wavelength of each channel of a wavelength division multiplexed (WDM) signal, that is, a so-called optical channel monitor (OCM), and a WDM transmission device equipped with the WDM signal monitoring system.

2. Description of the Related Art

The WDM transmission device measures a power level and a wavelength of a Wavelength Division Multiplex (WDM) signal by Optical Channel Monitor (OCM). Examples of construction of the OCM are shown in FIGS. 1 and 2. An example in FIG. 1 demultiplexes a WDM signal by an Arrayed Waveguide Grating (AWG) divider 10, and receives it with a photodiode (PD) array 12. In addition, an example in FIG. 2 spatially performs dispersion using a diffraction grating 14, and receives it with a PD array 16.

Regarding an OCM, in order to reduce cost, it is desirable to reduce the number of PDs. In the example of FIG. 1, four PDs per each channel are used as shown in an enlarged view on a right-hand side in FIG. 1. Then, the example finds a spectrum waveform by performing approximate calculation, such as Gaussian approximation, on the basis of a received light level of each PD, and determines the power level and wavelength of the signal. This approximation procedure is shown in FIG. 3. In FIG. 3, black dots 18 denote measured values from four PDs, and a curve 20 shows an approximated curve. By performing approximation as shown in the diagram, the power level P and wavelength λ of the channel are determined.

As an example, waveforms of 10-Gbps signal and 40-Gbps signal at the time of adopting a Non Return to Zero (NRZ) modulation system are shown in FIGS. 4 and 5, respectively. In this way, waveforms of a signal are different when bit rates of the signal are different.

Therefore, there is a problem that accuracy of an approximate calculation of OCM deteriorates and the power level and wavelength that are measured shift from actual values. In addition, as exemplified as a schematic diagram in FIG. 6, since spectral shapes change also by modulation systems, there is the same problem. Therefore, since the power level of the WDM signal is controlled on the basis of the wrong power level information, tilt compensation is not fully performed.

In addition to the above-mentioned problems, since the number of filters and nonlinear effects that are passed is different also with a route along which a path of an optical signal received has already passed, there is a problem that a spectrum waveform transforms.

SUMMARY

Various embodiments of the present invention provide a WDM signal monitoring system that includes a measuring unit that measures a power level of each of a plurality of predetermined wavelength bands in a wavelength division multiplex signal, a waveform determination unit that determines an approximate waveform of each of a plurality of channels that form the wavelength division multiplex signal based on bit rate information and modulation system information of each of the plurality of channels, and an approximation unit that determines a power level and a wavelength of each channel by approximating the power level measured in each of the plurality of predetermined wavelength bands with the approximate waveform determined for each of the plurality of channels.

Various embodiments of the present invention provide a wavelength division multiplex signal monitoring system including a divider that demultiplexes an input side wavelength division multiplex signal into a plurality of channels, an add-drop processor unit that performs add and drop processing on each channel demultiplexed by the divider, a plurality of optical variable attenuators that control a power level of an optical signal of each channel after add-drop processing, a synthesizer that multiplexes an optical signal after power level control, and generates an output side wavelength division multiplex signal, a measuring unit that measures a power of each of a plurality of predetermined wavelength bands in the output side wavelength division multiplex signal, a waveform determination unit that determines an approximate waveform of each of a plurality of channels that form the output side wavelength division multiplex signal based on bit rate information and modulation system information of each of the plurality of channels, an approximation unit that determines a power level and a wavelength of each channel, which the waveform determination unit determined, by approximating the power level measured in each of the plurality of predetermined wavelengths bands, and a controller that controls the plurality of optical variable attenuators based on the power level of each channel determined by the approximation unit.

BRIEF DESCRIPTION OF THE DRAWINGS

FIG. 20 is a table showing an example of a database in a device controller of a WDM transmission device according to an embodiment of the present invention;

FIG. 21 is a table showing an example of a waveform database of the OCM according to an embodiment of the present invention;

FIG. 22 is a table showing an example of a database in the device controller of the WDM transmission device, including route information according to an embodiment of the present invention;

FIG. 23 is a table showing an example of a waveform database which OCM has and which includes route information according to an embodiment of the present invention; and FIG. 24 is a table showing an example of a database of a network monitor according to an embodiment of the present invention.

DETAILED DESCRIPTION OF THE EMBODIMENTS

Figure 1:
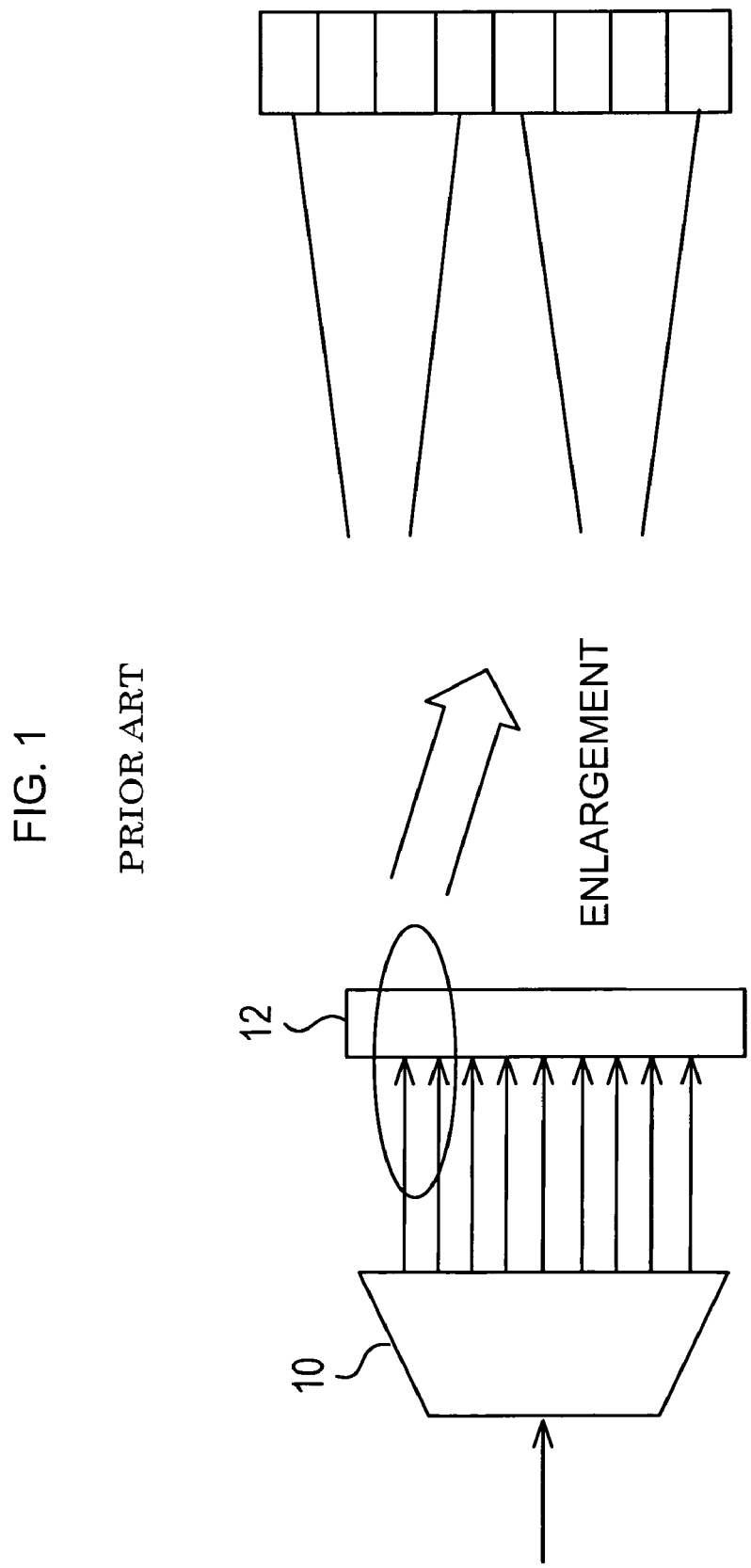
FIG. 1 is a diagram showing a first example of a conventional OCM.
Figure 2:
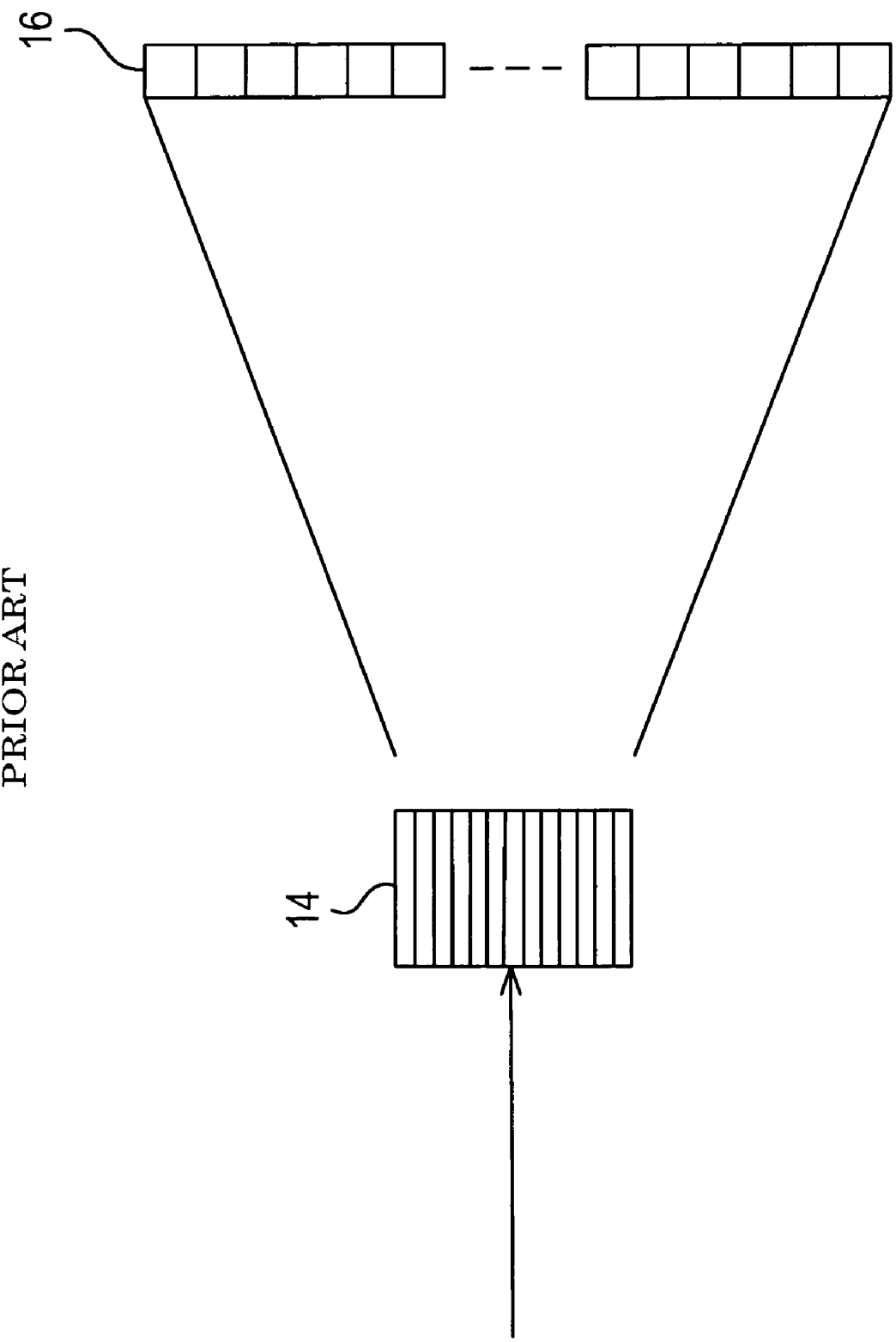
FIG. 2 is a diagram showing a second example of the conventional OCM.
Figure 3:
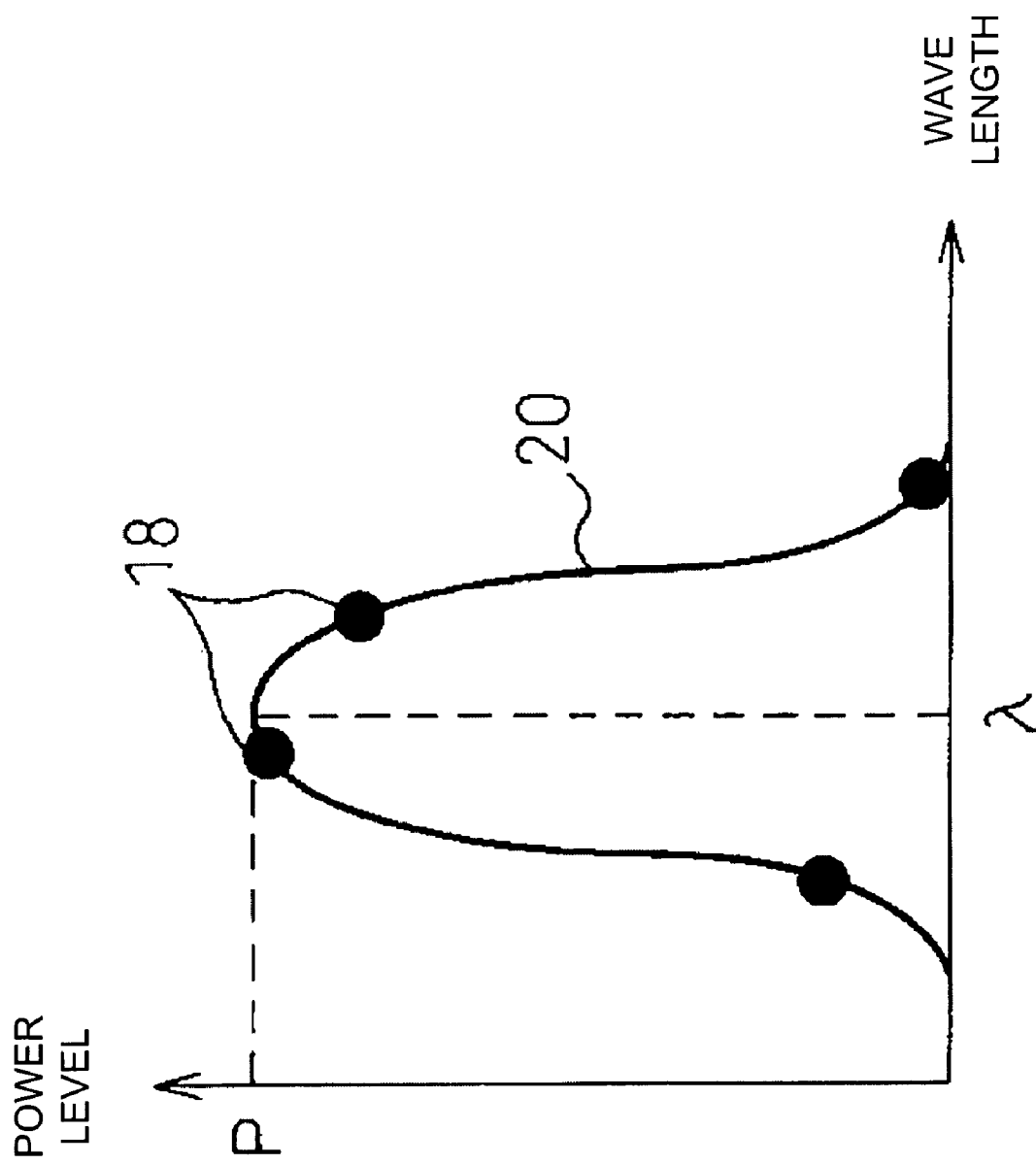
FIG. 3 is an explanatory graph about a determination method of a wavelength and a power level in the conventional OCM.
Figure 4:
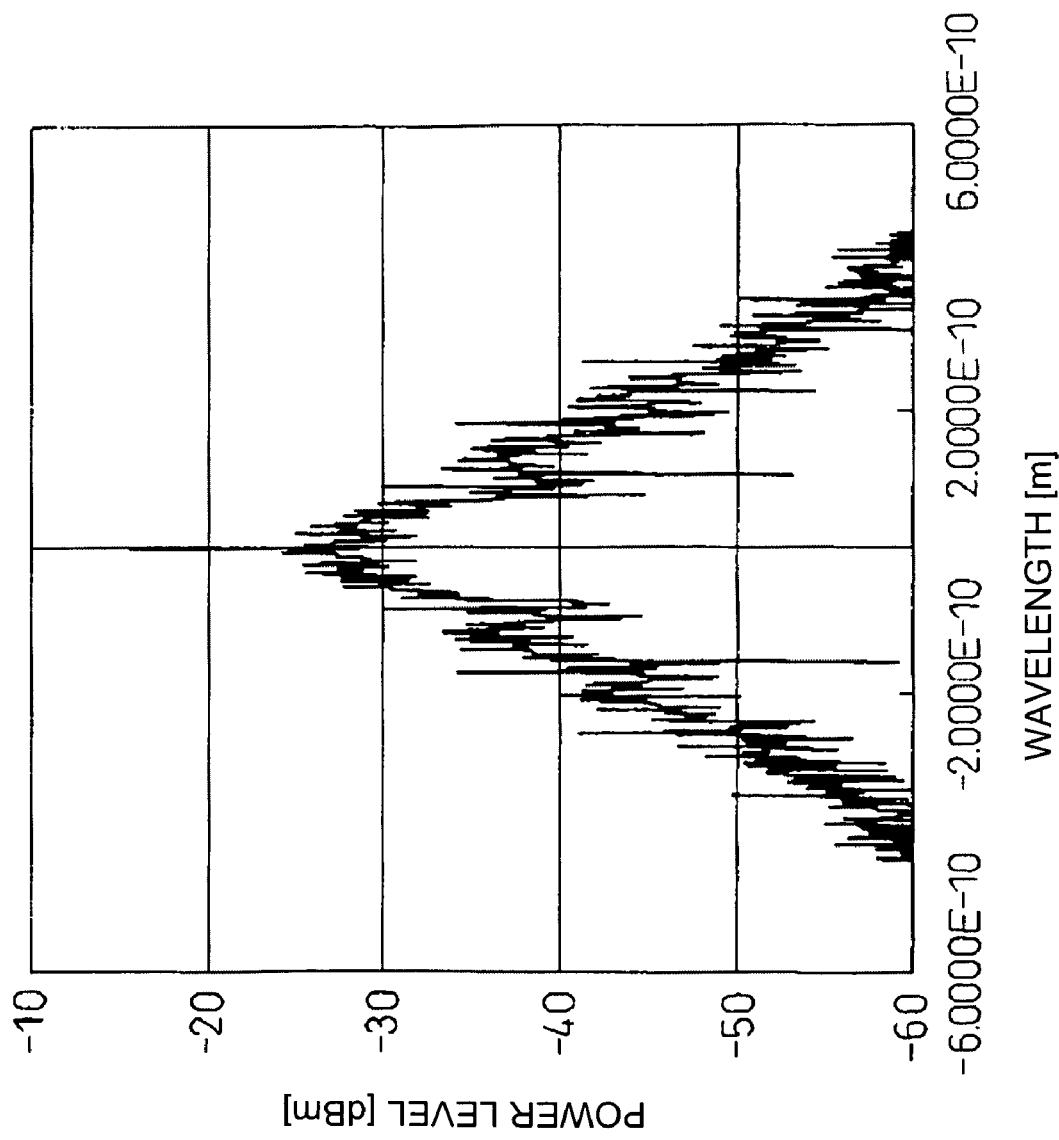
FIG. 4 is a chart showing a waveform of 10-Gbps NRZ.
Figure 5:
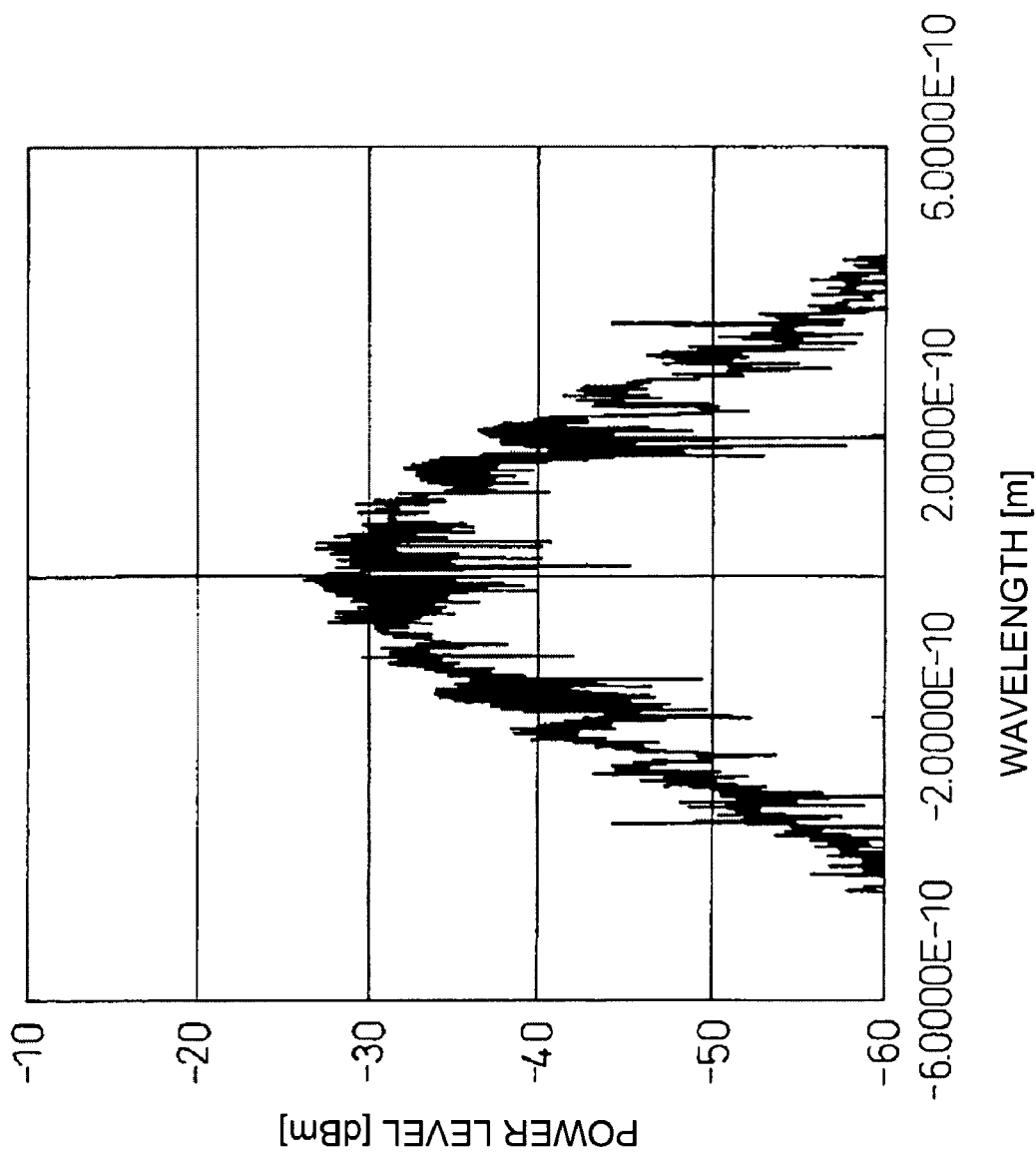
FIG. 5 is a chart showing a waveform of 40-Gbps NRZ.
Figure 6:
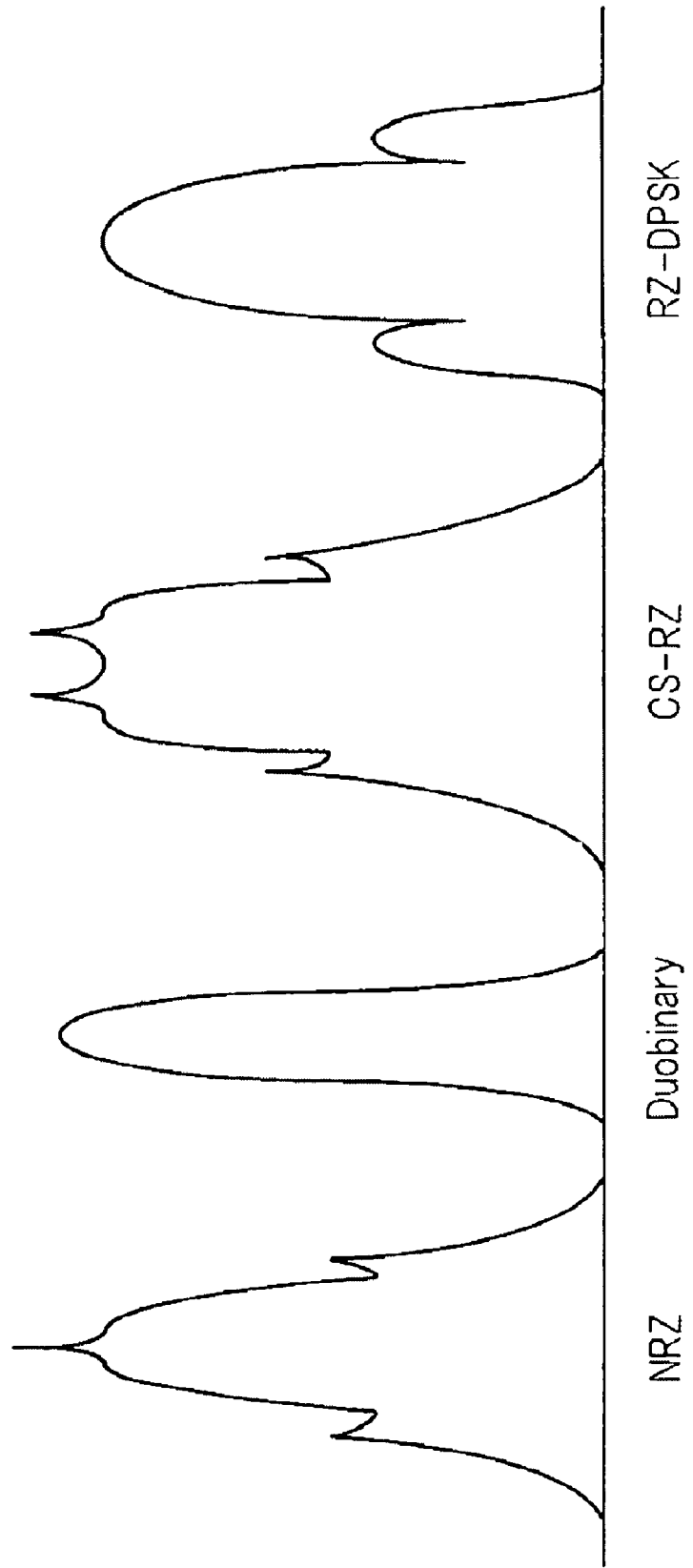
FIG. 6 is a chart showing difference among waveforms according to modulation systems.
Figure 7A:
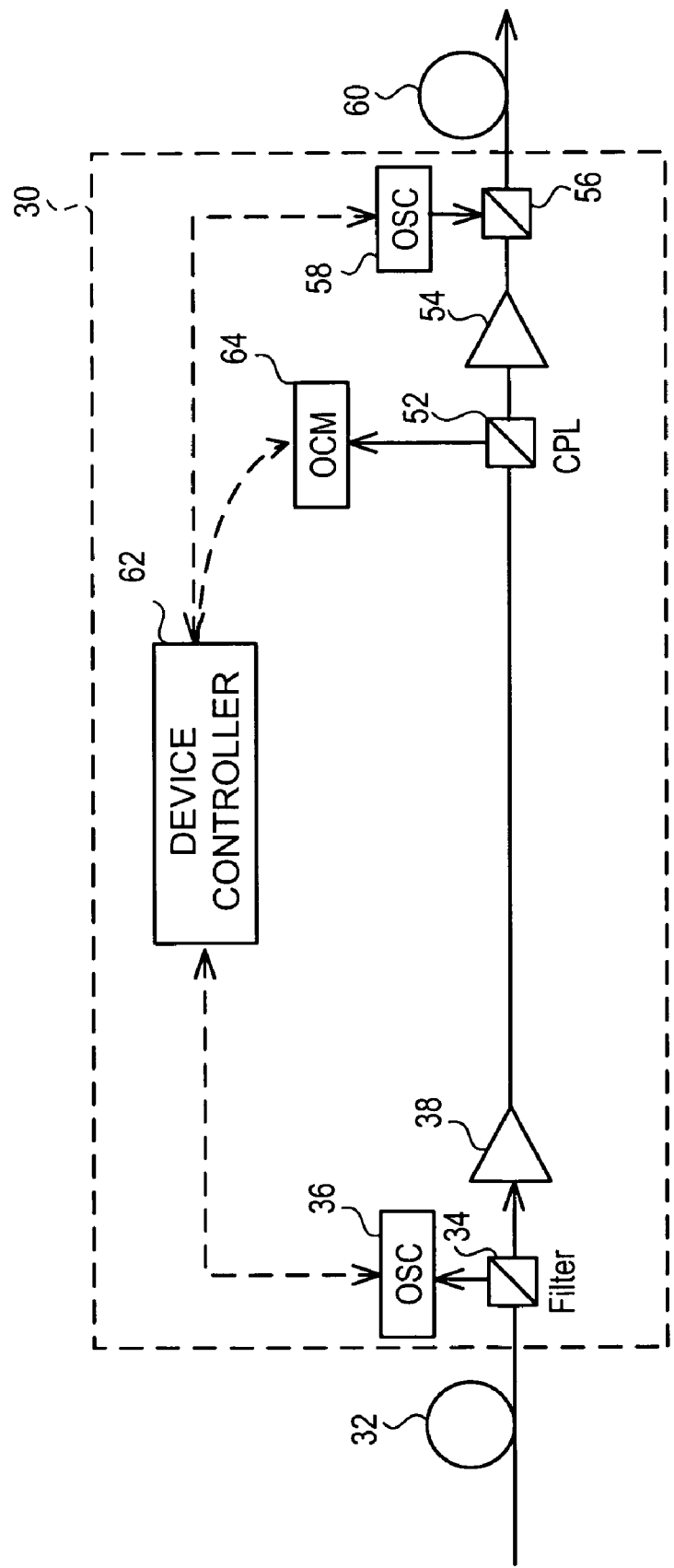
FIG. 7A is a block diagram showing a first construction of a WDM transmission device according to an embodiment of the present invention.
Figure 7B:
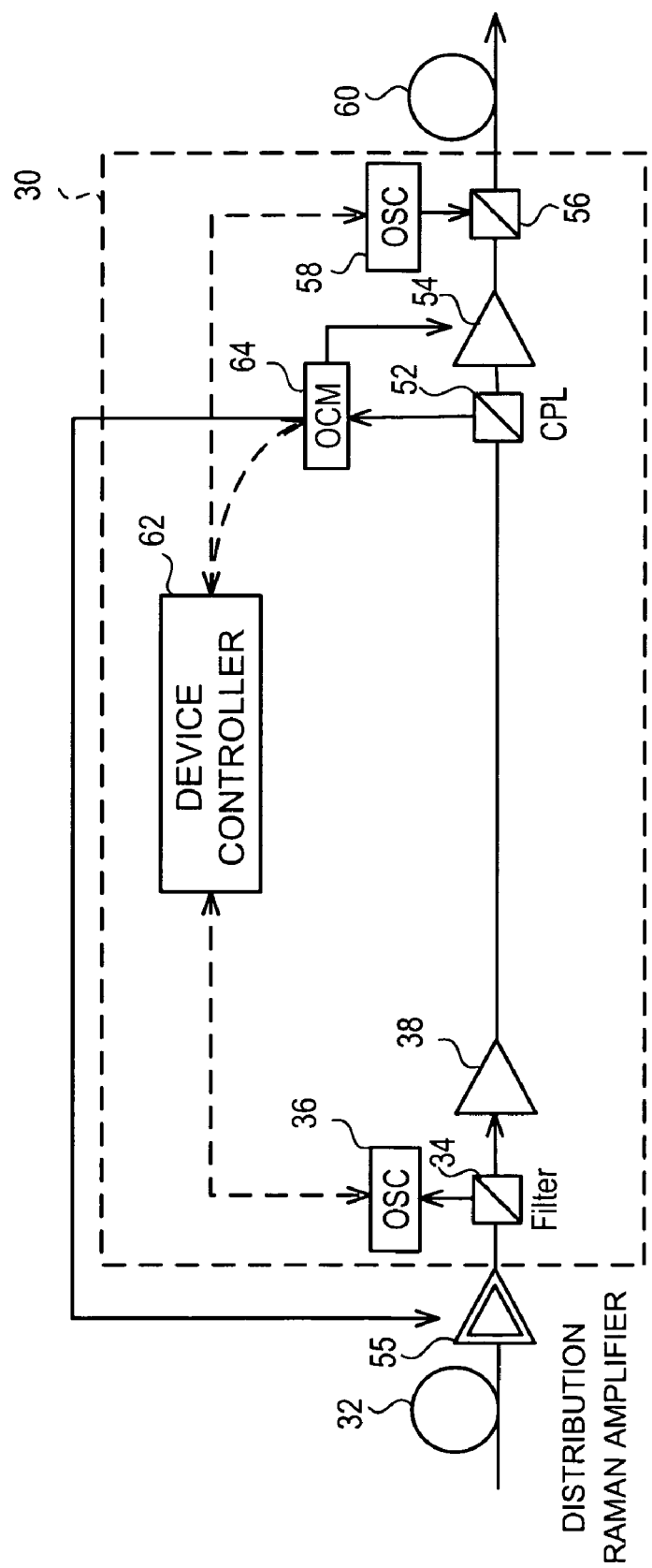
FIG. 7B is a block diagram showing a second construction of the WDM transmission device according to an embodiment of the present invention.

FIGS. 7A and 7B show examples of construction of a WDM transmission device 30 according to an embodiment of the present invention. In FIG. 7B, a distribution Raman amplifier 55 is in a transmission passage 32, and this distribution Raman amplifier 55 includes a pumping light generator and a pumping light controller. A WDM signal is amplified by controlling pumping light strength (pump power) with the pumping light controller. An OSC, which includes type information on a signal of each channel, including a bit rate, a modulation system, etc., in an Optical Supervisory Channel (OSC) coupler 34 is separated from the signal sent from a preceding stage of the WDM transmission device through the transmission passage 32, and is sent to an OSC unit 36. Other WDM signals are amplified by optical amplifiers 38 and 54, and are multiplexed with the OSC from an OSC unit 58 in an OSC coupler 56 to be sent out to a transmission passage 60.

Figure 7C:
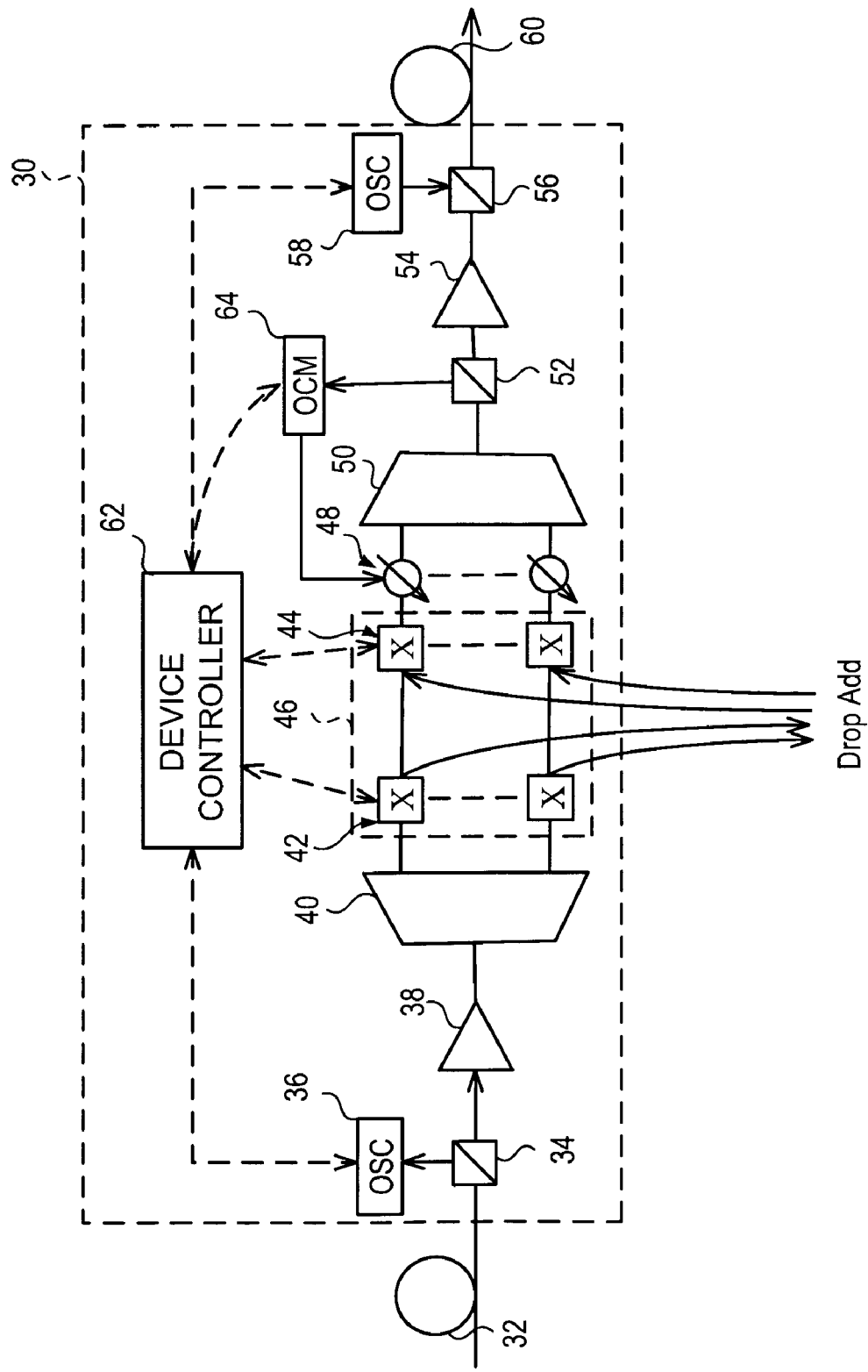
FIG. 7C is a block diagram showing a third construction of the WDM transmission device according to an embodiment of the present invention.
Figure 7D:
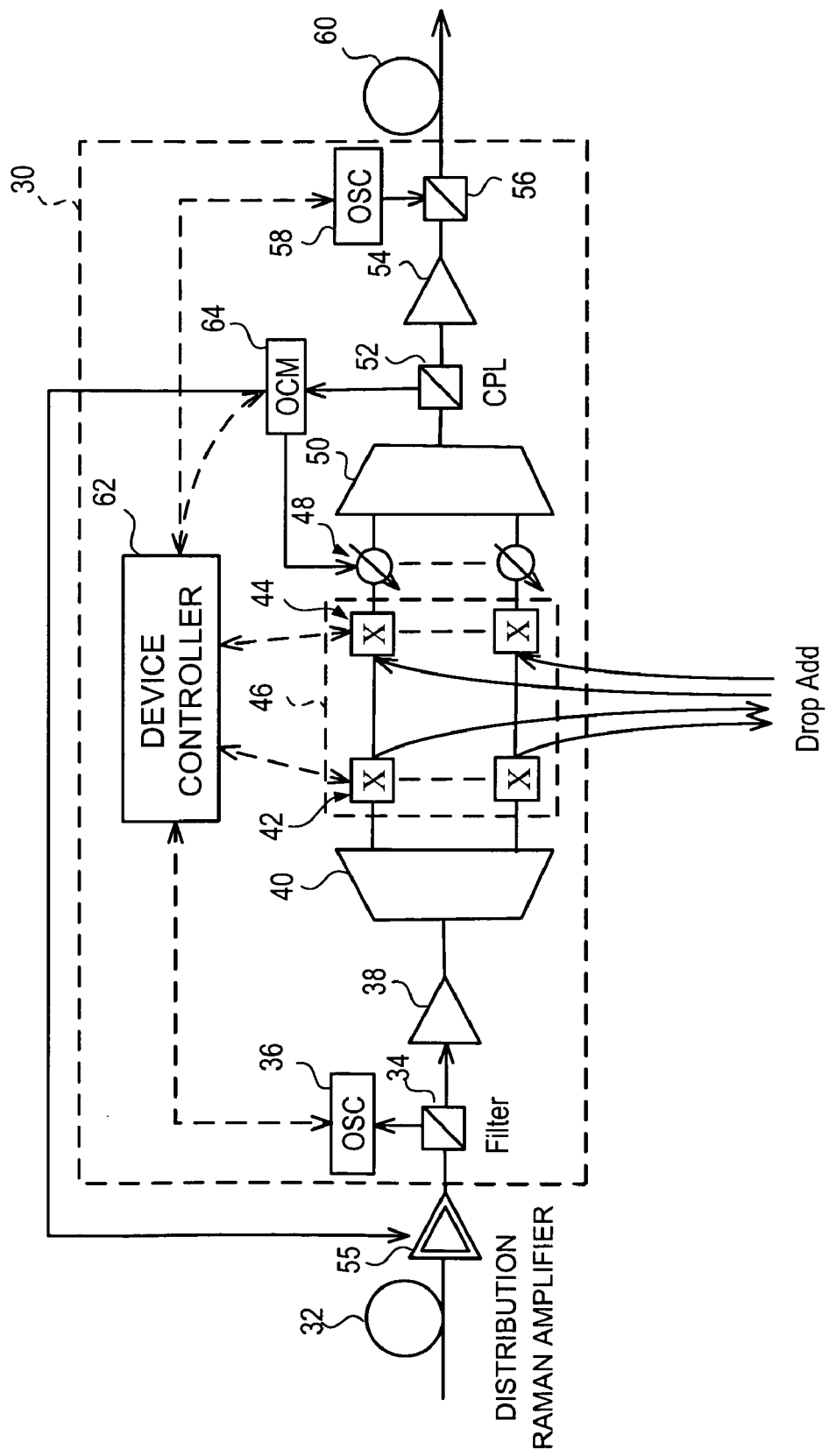
FIG. 7D is a block diagram showing a fourth construction of a WDM transmission device according to an embodiment of the present invention.

FIGS. 7C and 7D show other examples of construction of the WDM transmission device 30. In FIG. 7D, the distribution Raman amplifier 55 is in the transmission passage 32 and the WDM signal is amplified. An OSC, which includes the type information on the signal of each channel, including the bit rate, modulation system, etc., in the OSC coupler 34 is separated from the signal sent from a preceding stage of the WDM transmission device through the transmission passage 32, and is sent to the OSC unit 36. Another WDM signal is amplified by the optical amplifier 38 and is separated into each channel in a divider 40 to be inputted into an add-drop unit 46, which is constructed of drop optical switches 42 and add optical switches 44. A drop optical switch 42 performs switching of passing through this WDM transmission device or dropping into a low order device (not illustrated), every channel. An add optical switch 44 selects an optical signal from the optical switch 42 or optical signal from the low order device (not illustrated), every channel. The optical signals which come out of the add-drop unit 46 are multiplexed by a synthesizer 50 after a power level is adjusted every channel by each optical variable attenuator 48. The WDM signal which comes out of the synthesizer 50 is partially split for measurement by an optical coupler 52, and the residual is amplified by an optical amplifier 54, and is multiplexed with the OSC, derived from the OSC unit 58, by an OSC coupler to be sent out to a transmission passage 60.

A device controller 62 controls each optical switch in the add-drop unit 46 on the basis of the information from the OSC unit 36, and controls the OSC unit 58. The device controller 62 sends information, including a channel name, the bit rate, the modulation system, etc., to the following WDM transmission device through the OSC unit 58 through the transmission passage 60. The device controller 62 will be described in full detail later.

An OCM unit 64 measures a power level and a wavelength in each channel about the WDM signal separated by the optical coupler 52. Furthermore, on the basis of the result, the OCM unit 64 may perform tilt compensation by controlling the optical variable attenuator 48 or distribution Raman amplifier 55 so that a power level in each channel may become a target level. In addition, the OCM unit 64 passes measurement results of the power level and wavelength in each channel to the optical variable attenuator 48 or distribution Raman amplifier 55, and may perform tilt compensation by performing control so that the power level in each channel may become the target level in the optical variable attenuator 48 or distribution Raman amplifier 55. The OCM unit 64 will be described in full detail later.

Figure 8:
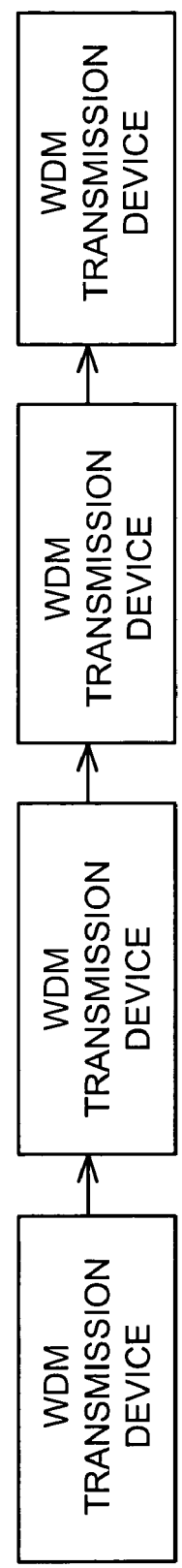
FIG. 8 is a diagram showing a linear connection network according to an embodiment of the present invention.
Figure 9:
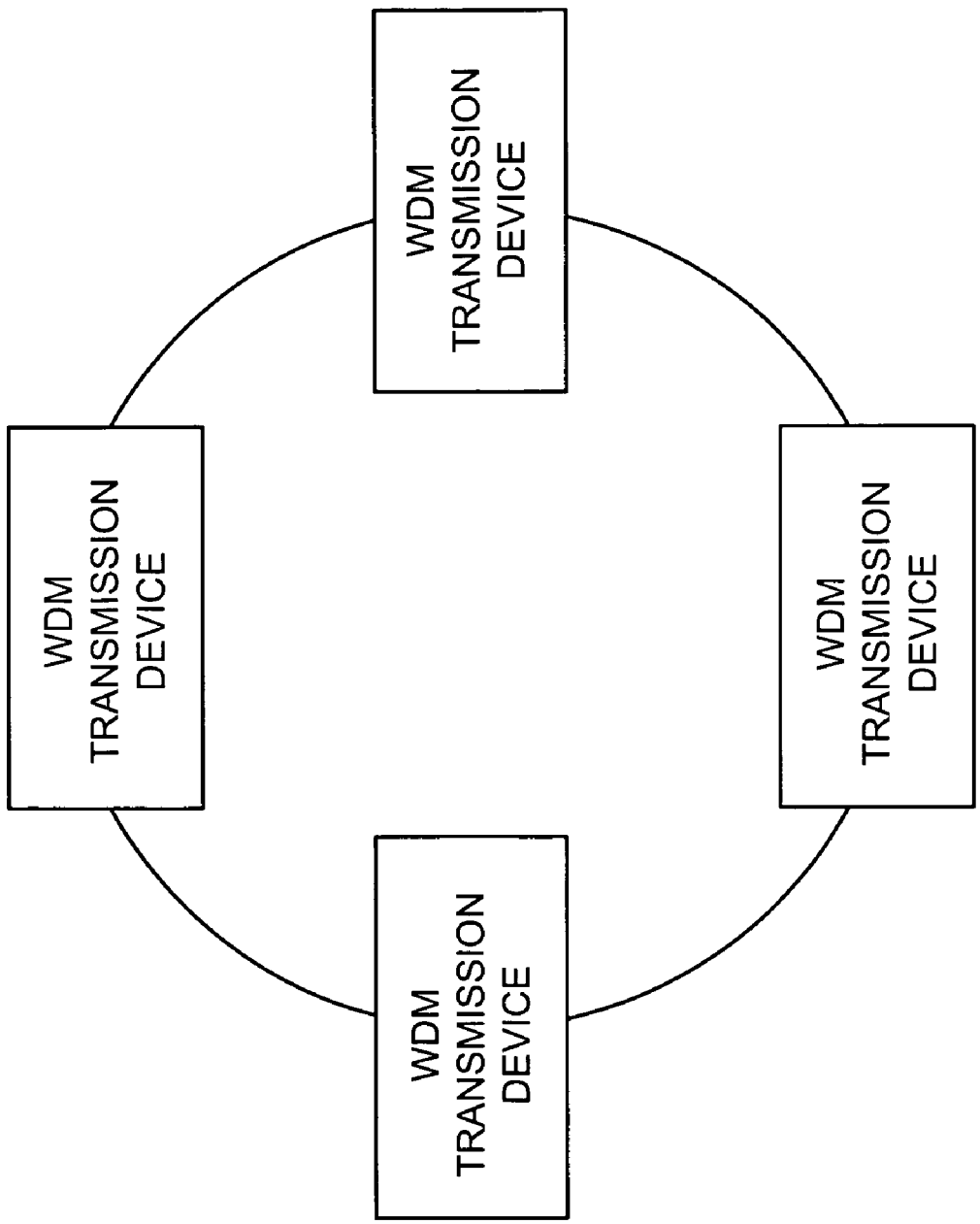
FIG. 9 is a diagram showing a ring connection network according to an embodiment of the present invention.
Figure 10:
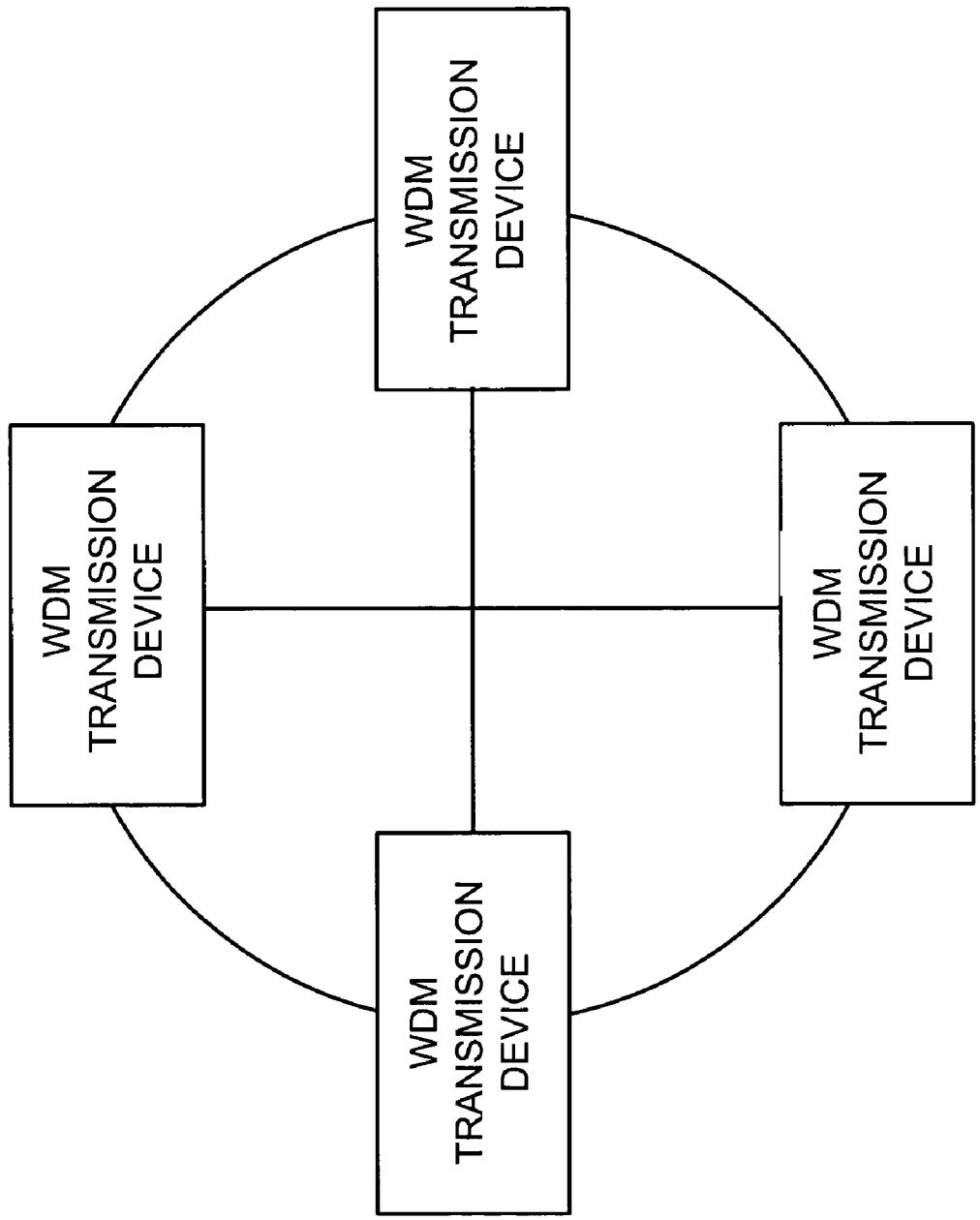
FIG. 10 is a diagram showing a mesh connection network according to an embodiment of the present invention.

When a path is newly set, assignment of a transponder and setting of a wavelength are performed, and a bit rate and a modulation system are determined. A device controller 62 of a WDM transmission device along which the path newly set passes first (is added) generates data of a channel name, a bit rate, and a modulation system about this path to store them in a database. Then, the device controller 62 sends the generated data to the following WDM transmission device using an OSC. In the following WDM transmission device, the sent data is stored in a database and transferred to the next WDM transmission device. This is repeated until the data reaches a WDM transmission device that a path passes at the end (is dropped). Thereby, data of the channel name, bit rate, modulation system, etc. of the path newly set is stored in the database of the device controller 62 of the WDM transmission device that the path passes. Since this data is carried along the set path, even if network construction is a linear type shown, as shown in FIG. 8, a ring type, as shown in FIG. 9, or a mesh type, as shown in FIG. 10, data shown in FIG. 20, as an example, is stored in the database of the device controller 62 about all the channels that the WDM transmission device accommodates.

Figure 11:
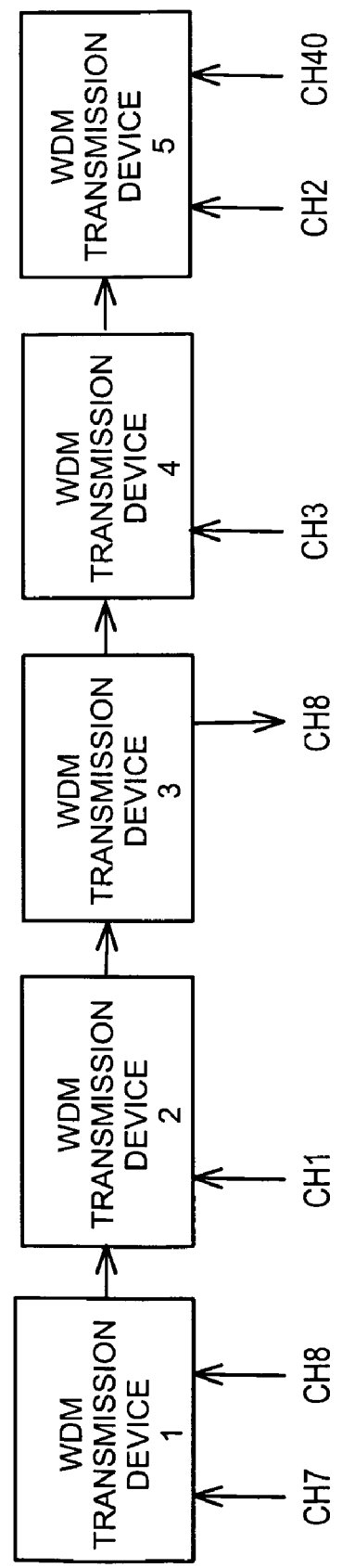
FIG. 11 is a diagram showing an example of the linear connection network according to an embodiment of the present invention.

The data shown in FIG. 20 is the data in the WDM transmission device 5 in the network where five WDM transmission devices which accommodate 40 wavelengths are connected linearly as shown in FIG. 11. In FIG. 20, data in a channel 1 is data transmitted from a transmission device 2, and data in a channel 3 is data transmitted from a WDM transmission device 4.

In the OCM unit 64, the data shown in FIG. 20 is used to determine an approximate waveform of each channel.

Figure 12:
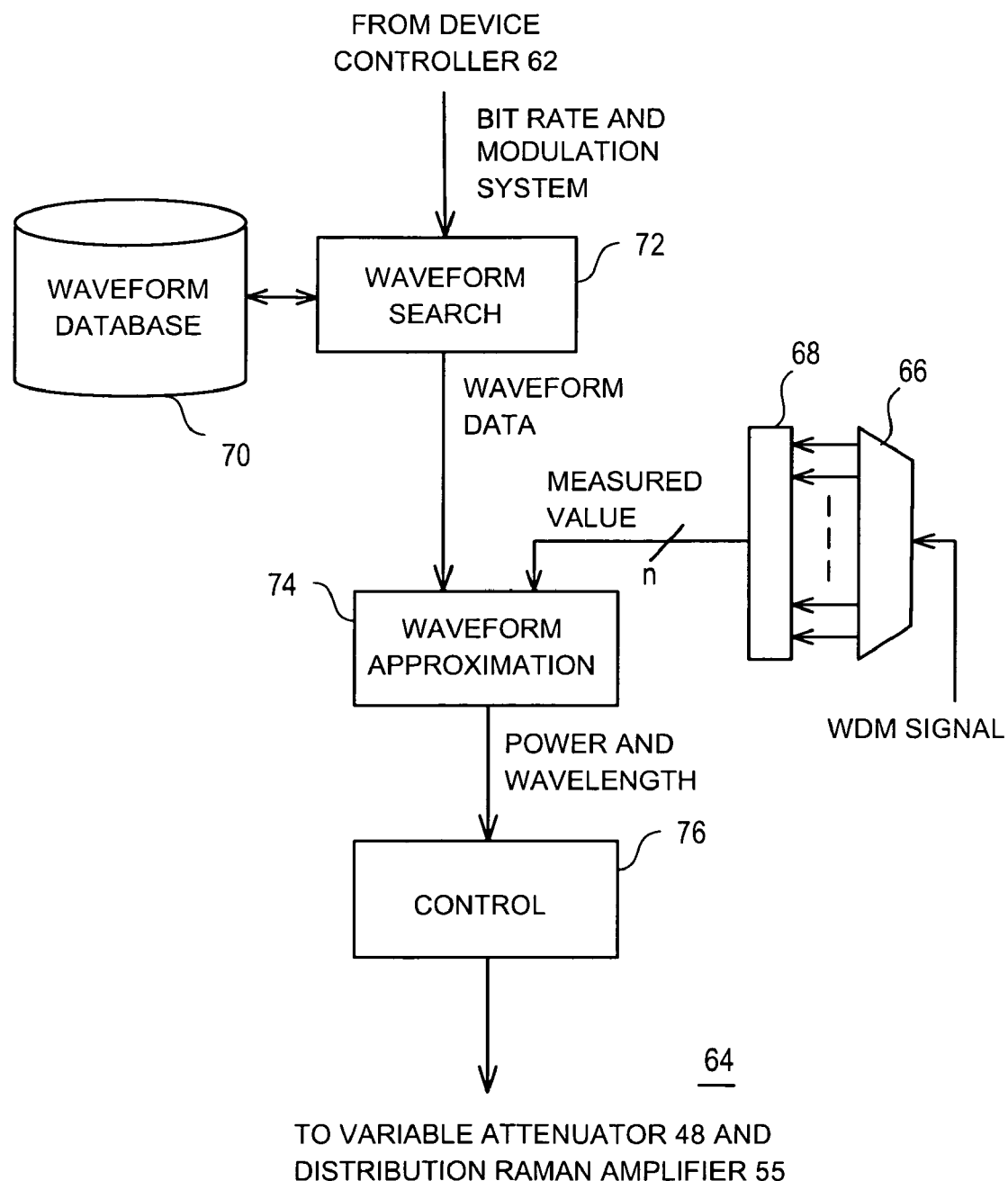
FIG. 12 is a block diagram showing detailed construction of an OCM unit according to an embodiment of the present invention.

FIG. 12 shows a detailed construction of the OCM unit 64.

A divider 66 and a PD array 68 measure each power level of a plurality of predetermined wavelength bands (for example, 4 to 6 wavelengths per each channel). On the other hand, for example, as shown in FIG. 21, data of approximate waveforms is stored in a waveform database 70 of all the possible combinations of the bit rate and modulation system.

Figure 13:
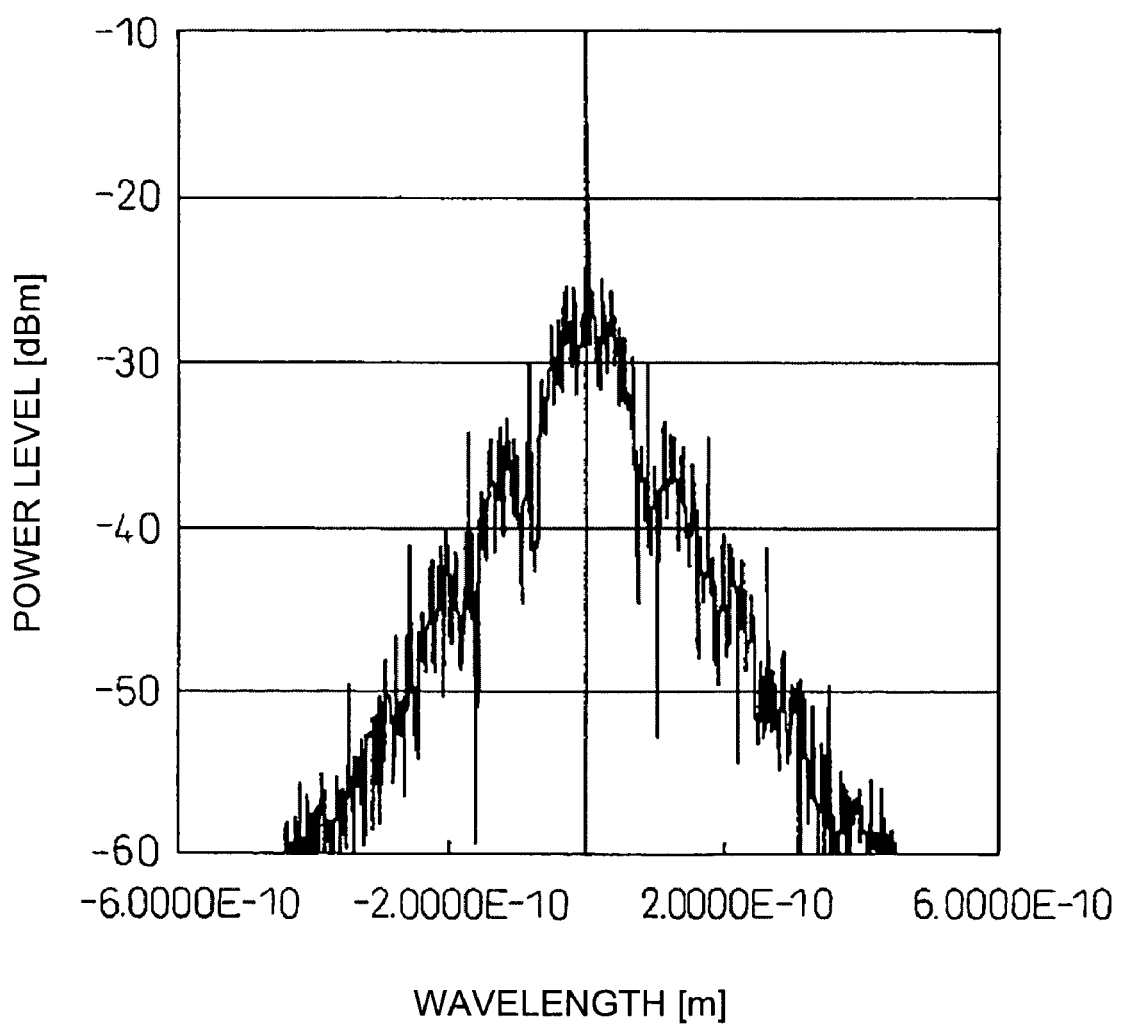
FIG. 13 is a chart showing a first example of waveform data stored in a waveform database according to an embodiment of the present invention.
Figure 14:
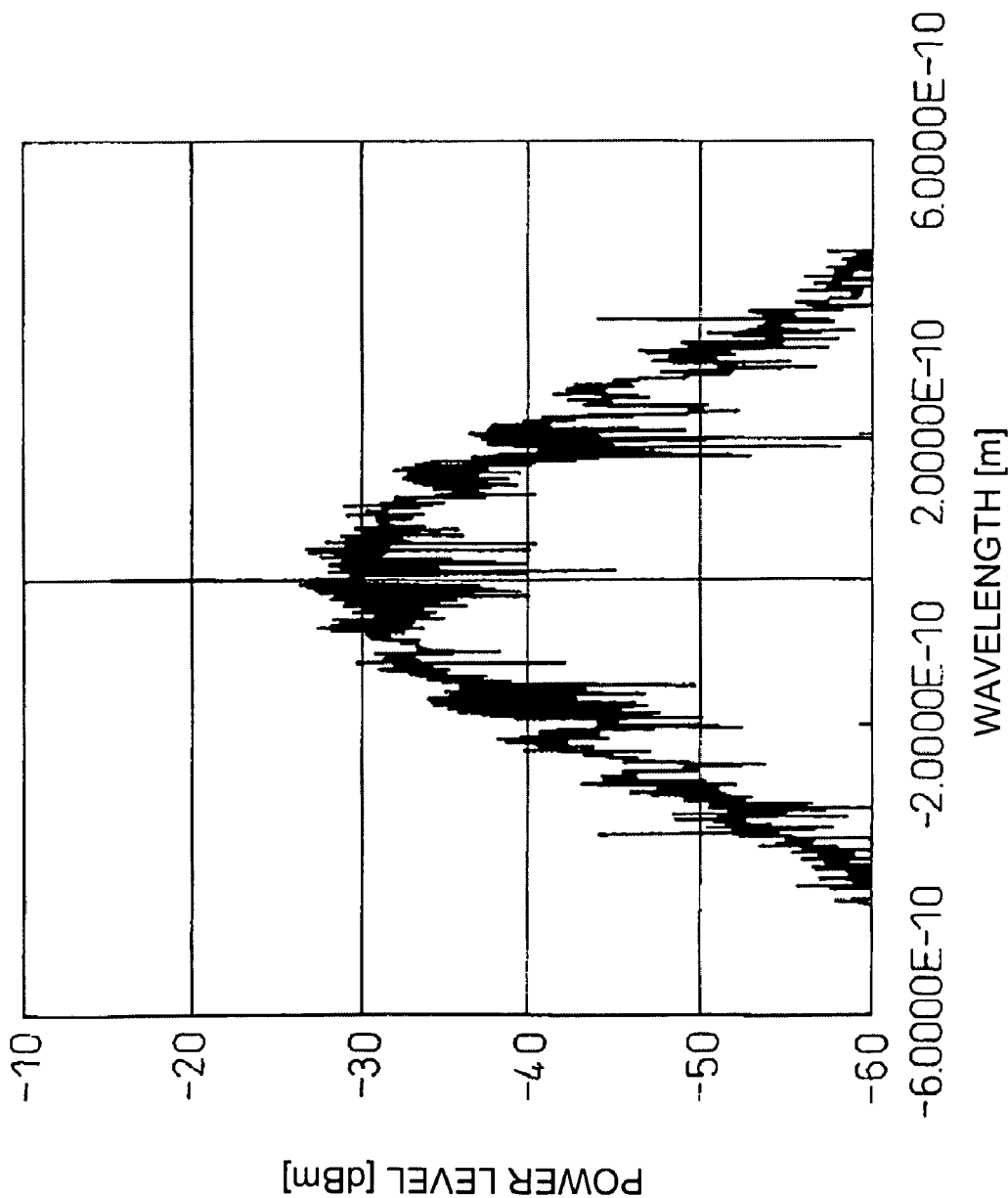
FIG. 14 is a chart showing a second example of waveform data stored in the waveform database according to an embodiment of the present invention.

Approximate waveforms in FIG. 21 can be obtained by measurement data, numerical computation, or the like. FIGS. 13 and 14 show an approximate waveform 1 and an approximate waveform 2, respectively, which are obtained by numerical computation, respectively.

Returning to FIG. 12, a waveform search unit 72 searches the waveform database 70 on the basis of the bit rate information and modulation system information of each channel from the device controller 62 to determine an approximate waveform of each channel. A waveform approximation unit 74 approximates the measured values of the power level in a several number of wavelengths per channel which are outputted from the PD array 68 with an approximate waveform determined in the waveform search unit 72, thereby determining a more precise power level and waveform. A controller 76 performs tilt compensation by controlling the optical variable attenuator 48 or distribution Raman amplifier 55 so that a power level in each channel that the waveform approximation unit 74 determines may become a target power level. In addition, the controller 76 may be mounted in a side of the optical variable attenuator 48 or distribution Raman amplifier 55, not the OCM unit 64.

Figure 15:
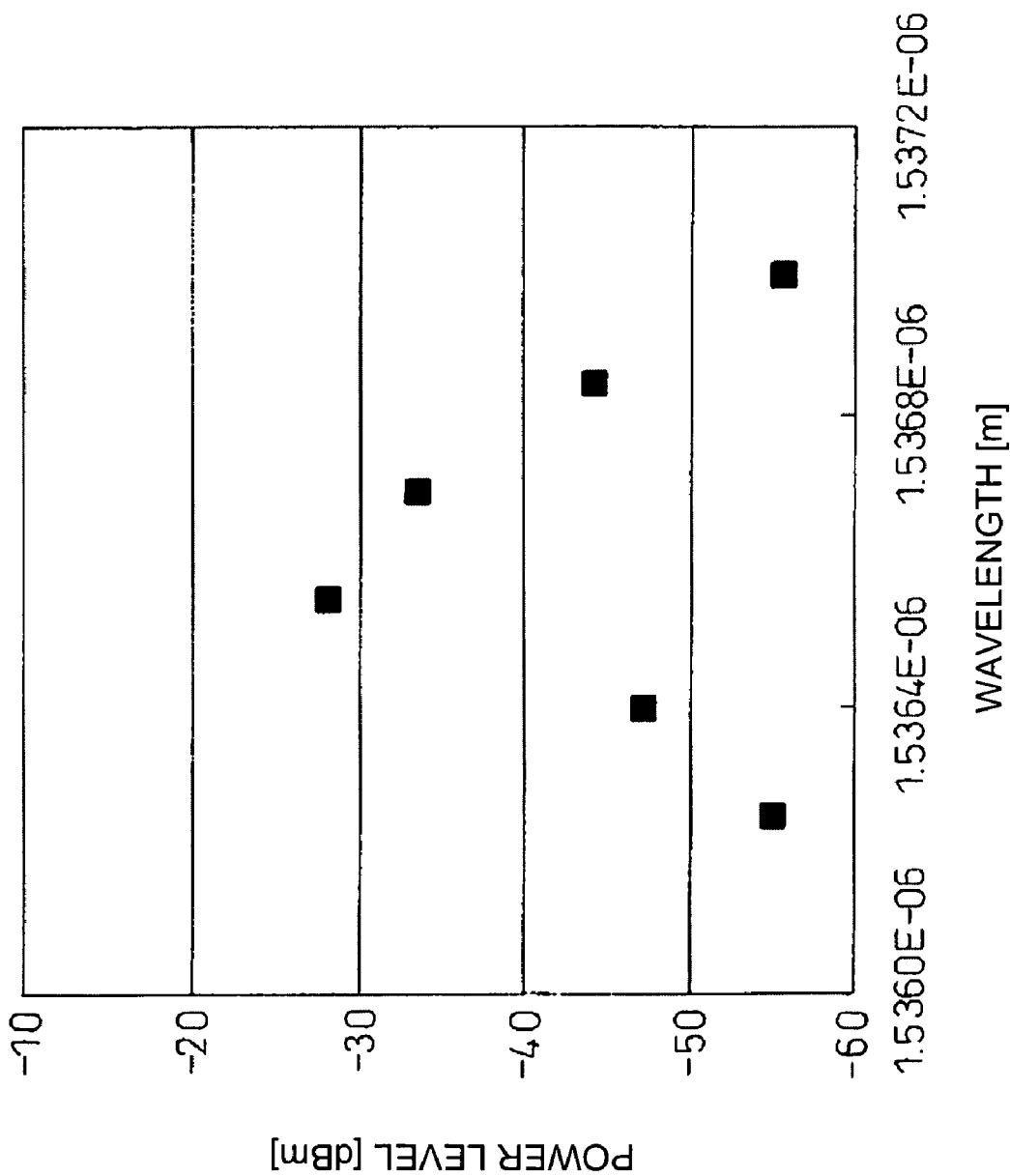
FIG. 15 is a graph showing measurement data by PDs according to an embodiment of the present invention.
Figure 16:
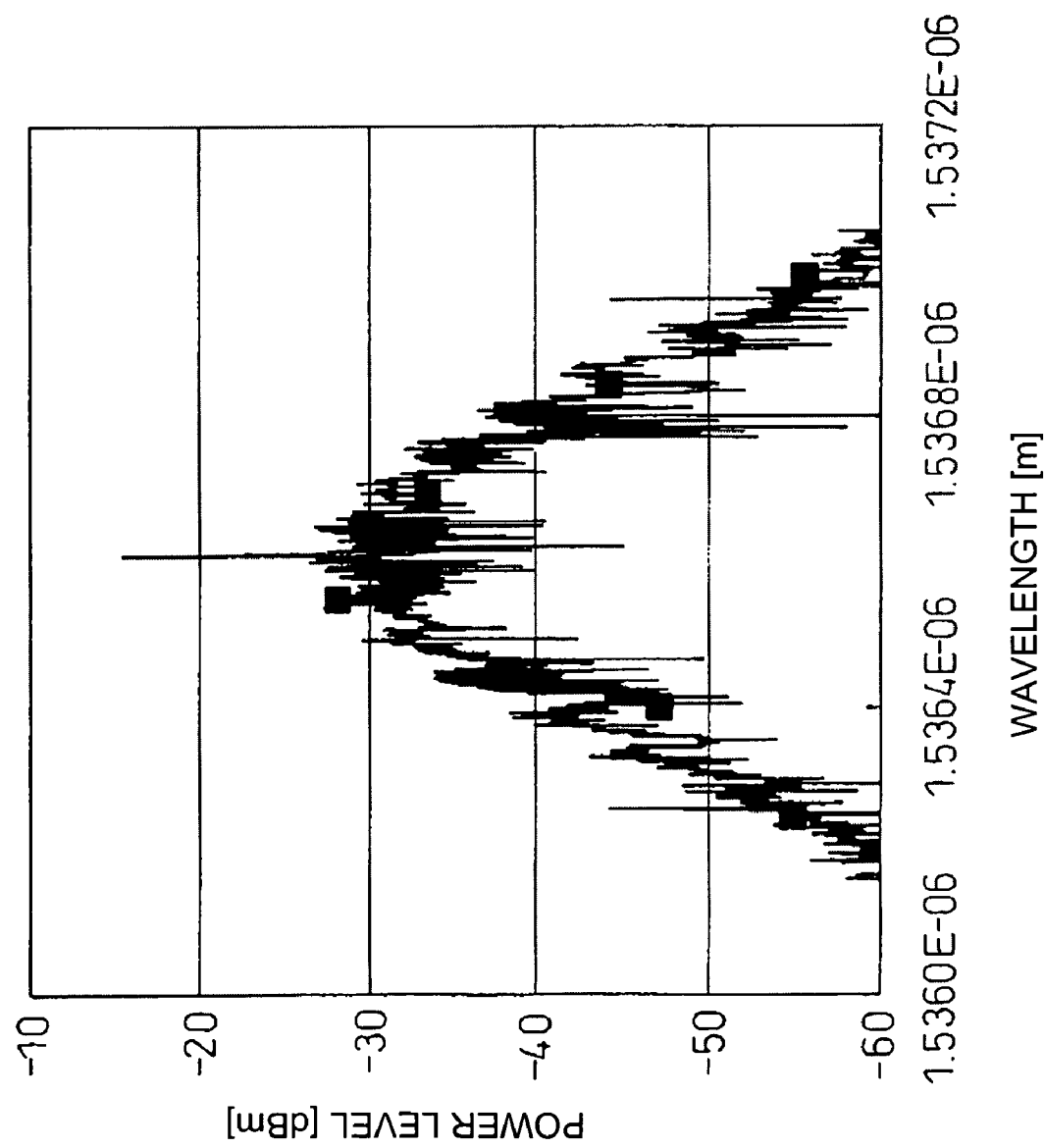
FIG. 16 is a chart showing an example of approximating measurement data with an approximate waveform determined from the bit rate and modulation system according to an embodiment of the present invention.

As an example, a case of performing measurement about a CH 7 in the database of the device controller 62 shown in FIG. 20 is shown in the WDM transmission device 5 in FIG. 11. When this signal is inputted into the OCM, it is measured by the PD array as shown in FIG. 13. In addition, an interval of PDs is set at 0.15 nm. Then, on the basis of the information on the CH 7 in FIG. 20, the approximate waveform 2 in FIG. 14 is acquired from the waveform database in FIG. 21, and the measured values in FIG. 15 are approximated. That result is shown in FIG. 16. Thereby, the accurate power level and wavelength can be measured.

Since a waveform changes with a filter, which is provided in a WDM transmission device, when considering the route information on each channel, in addition to the bit rate and modulation system of each channel and performing selection of a waveform, it is possible for a much more accurate determination. An example of the database of the device controller 62 in this case is shown in FIG. 22, and an example of a waveform database is shown in FIG. 23. The WDM transmission device is the transmission device 5 in the network shown in FIG. 11, similar to FIGS. 20 and 21.

As route information, an output number of the WDM transmission devices that passed up to that time are used. A channel whose route information is blank shows that it is a channel added in the WDM transmission device.

Figure 17:
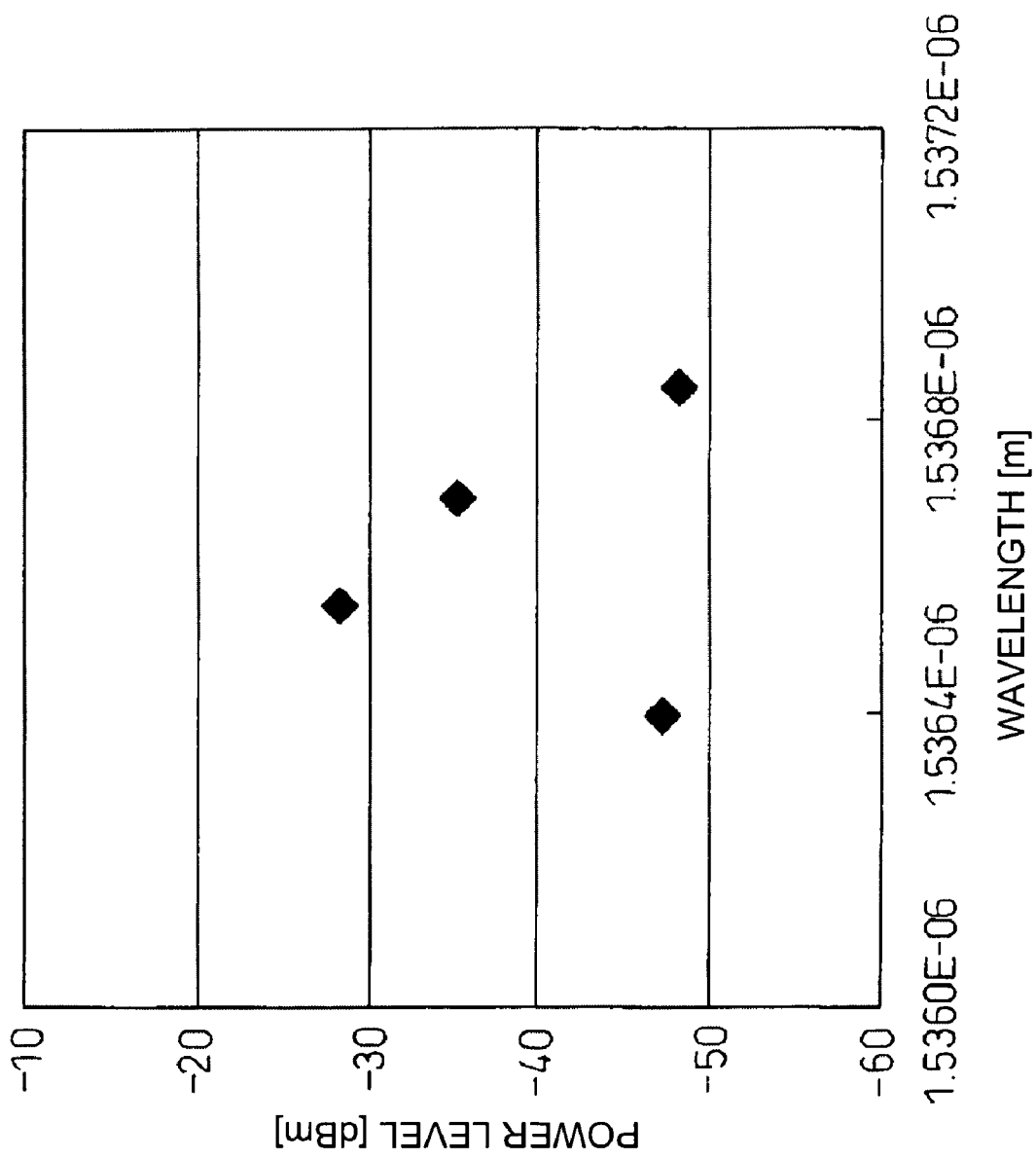
FIG. 17 is a graph showing measurement data by PDs according to an embodiment of the present invention.
Figure 18:
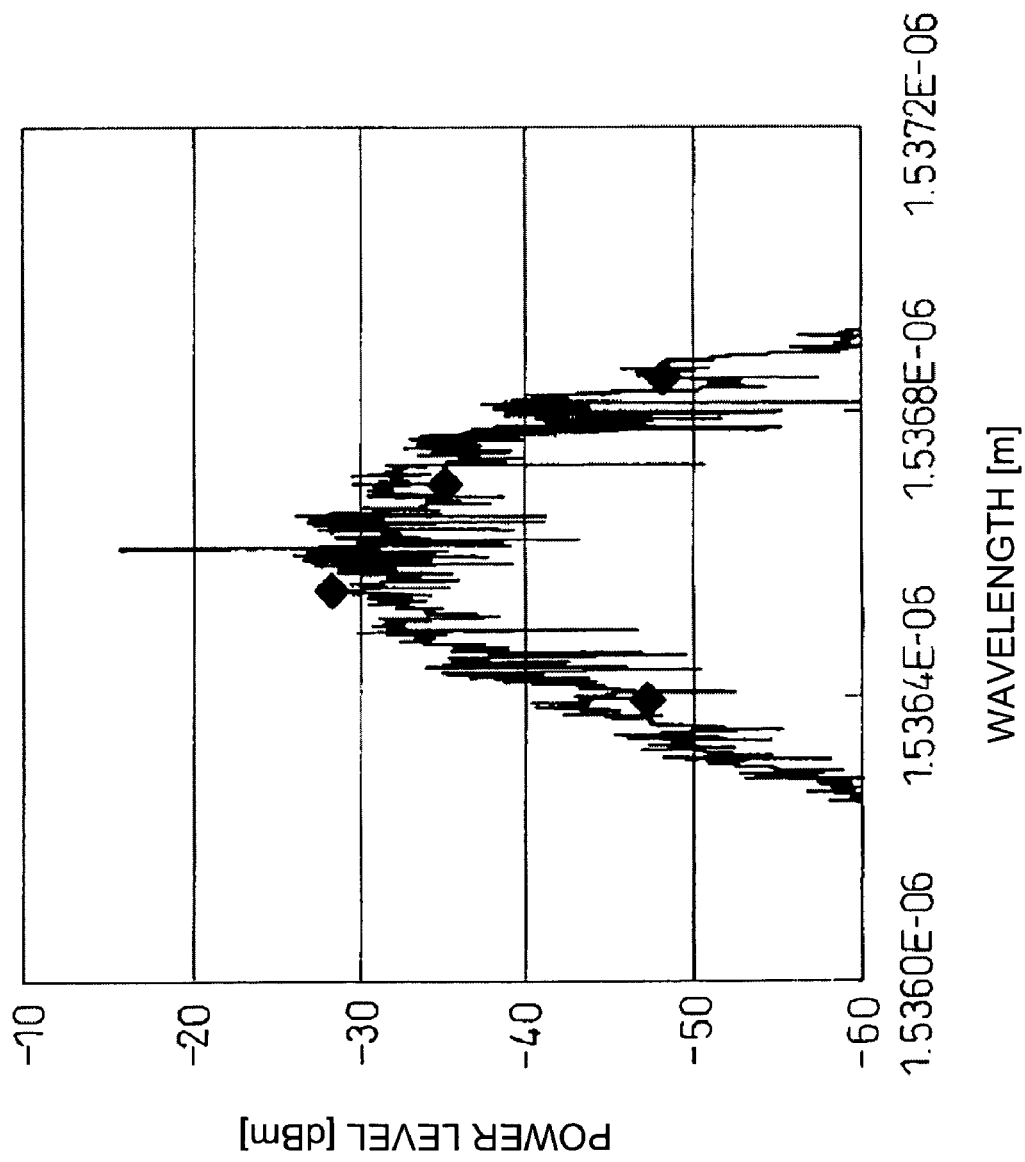
FIG. 18 is a chart showing an example of approximating measurement data with an approximate waveform which is determined with further adding route information according to an embodiment of the present invention.

Measured values obtained about the channel 7 (bit rate: 40 Gbit/s, route information: 1, 2, 3 and 4, and modulation system: NRZ) in FIG. 22 are shown in FIG. 17, and a result of approximating these using the approximate waveform 3 (said) in FIG. 23 is shown in FIG. 18.

Figure 19:
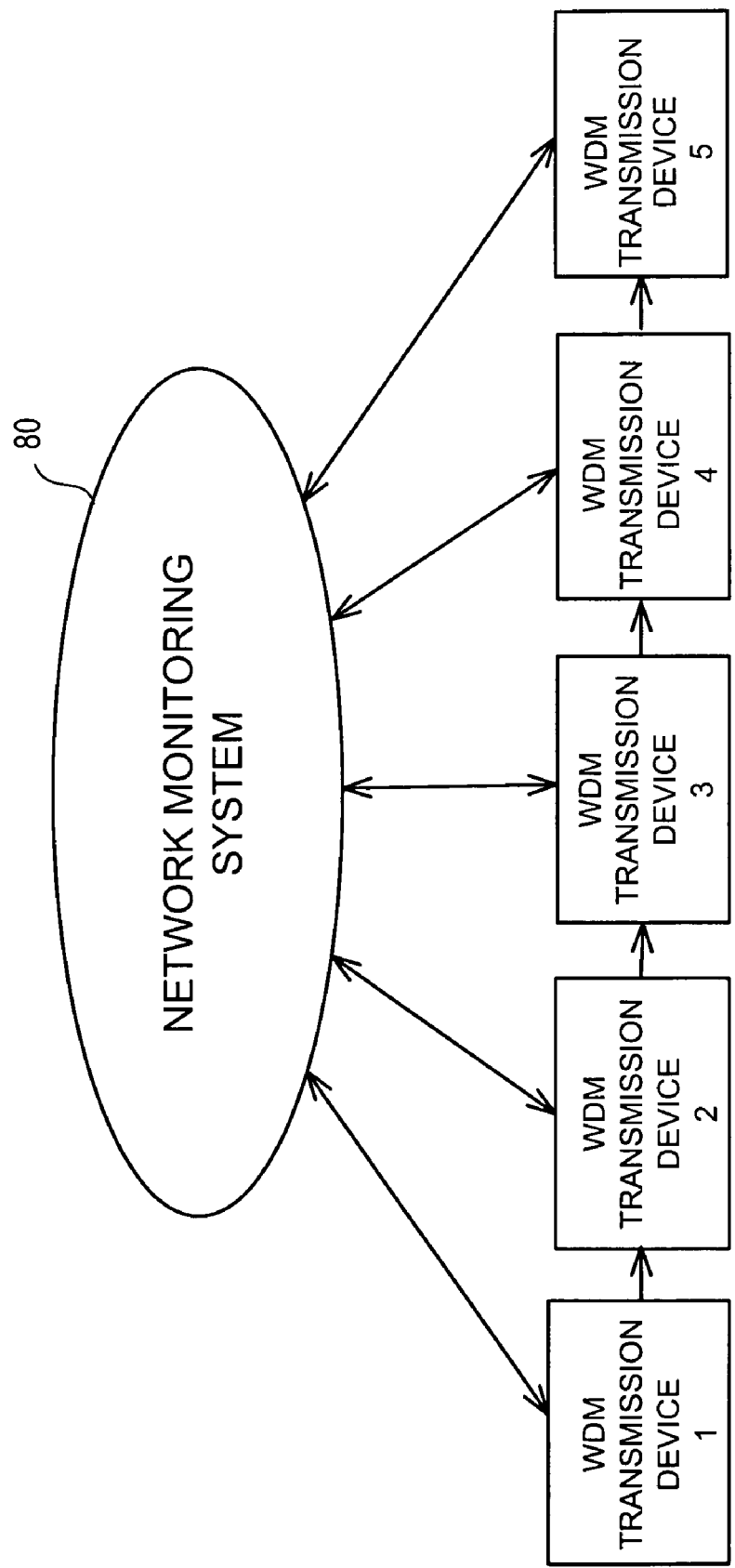
FIG. 19 is a diagram showing an example of controlling information, including a bit rate etc., by a network management system without using an OSC according to an embodiment of the present invention.

In the example described above, although information, including the bit rate, etc., is transmitted to each WDM transmission device using the OSC, the databases shown in FIG. 20 and FIG. 22 are held in respective WDM transmission devices, as shown in FIG. 19. It is also desirable to control information in a unified way in a network monitoring system 80. When adopting such construction, also in a WDM transmission device without an OSC unit, it is possible to accurately obtain the power level and wavelength of a WDM signal.

The network monitoring system 80 monitors a whole network, and when path setting is performed in each WDM transmission device, the information is reported to the network system 80 from each WDM transmission device. Thereby, a database such as that in FIG. 24 is produced. The OCM 64 of each WDM transmission device determines a power level and a wavelength on the basis of this database.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A wavelength division multiplex signal monitoring system, comprising:
   a measuring unit that measures a power level of each of a plurality of predetermined wavelength bands in a wavelength division multiplex signal;
   a waveform determination unit that determines an approximate waveform of each of a plurality of channels that form the wavelength division multiplex signal based on bit rate information and modulation system information of each of the plurality of channels, the waveform determination unit including a waveform database that stores approximate waveform data about each possible combination of bit rates, modulation systems, and route information including an output number of transmission devices passed until then; and
   an approximation unit that determines a power level and a wavelength of each channel by approximating the power level measured in each of the plurality of predetermined wavelength bands with the approximate waveform determined for each of the plurality of channels.

2. The wavelength division multiplex signal monitoring system according to claim 1, wherein the measuring unit includes:
   a divider that demultiplexes the wavelength division multiplex signal; and
   a plurality of photodetectors that detect the power level of light, demultiplexed by the divider, in a plurality of predetermined wavelength bands.

3. The wavelength division multiplex signal monitoring system according to claim 1, wherein the waveform determination unit further includes:
   a search unit that determines an approximate waveform of each channel by searching the waveform database based on a bit rate and a modulation system of each channel.

4. The wavelength division multiplex signal monitoring system according to claim 3, wherein the search unit searches the waveform database on the basis of a bit rate and a modulation system of each channel, and a route passed until then.

5. A wavelength division multiplex signal monitoring system, comprising:
- a divider that demultiplexes an input side wavelength division multiplex signal into a plurality of channels;
- an add-drop processor unit that performs add and drop processing on each channel demultiplexed by the divider;
- a plurality of optical variable attenuators that control a power level of an optical signal of each channel after add-drop processing;
- a synthesizer that multiplexes an optical signal after power level control, and generates an output side wavelength division multiplex signal;
- a measuring unit that measures a power of each of a plurality of predetermined wavelength bands in the output side wavelength division multiplex signal;
- a waveform determination unit that determines an approximate waveform of each of a plurality of channels that form the output side wavelength division multiplex signal based on bit rate information and modulation system information of each of the plurality of channels;
- an approximation unit that determines a power level and a wavelength of each channel, which the waveform determination unit determined, by approximating the power level measured in each of the plurality of predetermined wavelengths bands; and
- a controller that controls the plurality of optical variable attenuators based on the power level of each channel determined by the approximation unit.

6. The wavelength division multiplex signal monitoring system according to claim 5, wherein a wavelength division multiplex transmission device includes:
- a distribution Raman amplifier between the inputted wavelength division multiplex signal and the divider; and
- a controller that controls pump power of the distribution Raman amplifier base don the power level of each channel determined in the approximation unit.

7. The wavelength division multiplex signal monitoring system according to claim 5, wherein the measuring unit includes:
- a divider that demultiplexes a wavelength division multiplex signal; and
- a plurality of photodetectors that detect a power level of light, demultiplexed by the divider, in a plurality of predetermined wavelength bands.

8. The wavelength division multiplex signal monitoring system according to claim 5, wherein the waveform determination unit includes:
- a waveform database that stores approximate waveform data about each possible combination of bit rates and modulation systems; and
- a search unit that determines an approximate waveform of each channel by searching a waveform database based on a bit rate and a modulation system of each channel.

9. The wavelength division multiplex signal monitoring system according to claim 8, wherein the waveform database stores approximate waveform data about each possible combination of bit rates, modulation systems, and routes along passed until then; and
wherein the search unit searches a waveform database on the basis of a bit rate and a modulation system of each channel, and a route passed until then.

10. The wavelength division multiplex signal monitoring system according to claim 8, further comprising a device controller that informs the search unit of a bit rate and a modulation system of each channel, and a route passed until then.

11. The wavelength division multiplex signal monitoring system according to claim 10, wherein the device controller informs each bit rate and modulation system of a plurality of channels which form a wavelength division multiplex signal, and a route passed until then by an OSC (Optical Supervisory Channel) or a network monitoring system to another wavelength multiplexing transmission device, and creates a database of wavelength division multiplex signals in the device.

* * * * *

UNITED STATES PATENT AND TRADEMARK OFFICE
CERTIFICATE OF CORRECTION

PATENT NO. : 8,068,730 B2  Page 1 of 1
APPLICATION NO. : 12/219862
DATED : November 29, 2011
INVENTOR(S) : Yoshito Kachita et al.

It is certified that error appears in the above-identified patent and that said Letters Patent is hereby corrected as shown below:

Column 7, Line 39, In Claim 6, delete "base don" and insert -- based on --, therefor.

Signed and Sealed this
Twenty-eighth Day of February, 2012

David J. Kappos
*Director of the United States Patent and Trademark Office*